United States Patent
Mizushima et al.

(10) Patent No.: US 11,216,336 B2
(45) Date of Patent: Jan. 4, 2022

(54) STORAGE APPARATUS AND MEMORY DEVICE CONTROL METHOD

(71) Applicant: Hitachi, Ltd., Tokyo (JP)

(72) Inventors: Nagamasa Mizushima, Tokyo (JP); Akifumi Suzuki, Tokyo (JP); Hideyuki Koseki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 583 days.

(21) Appl. No.: 16/324,882

(22) PCT Filed: May 30, 2017

(86) PCT No.: PCT/JP2017/020099
§ 371 (c)(1),
(2) Date: Feb. 11, 2019

(87) PCT Pub. No.: WO2018/220714
PCT Pub. Date: Dec. 6, 2018

(65) Prior Publication Data
US 2021/0279130 A1  Sep. 9, 2021

(51) Int. Cl.
| | |
|---|---|
| G06F 11/10 | (2006.01) |
| G01K 3/06 | (2006.01) |
| G06F 1/3296 | (2019.01) |
| G06F 3/06 | (2006.01) |

(52) U.S. Cl.
CPC ........... *G06F 11/1068* (2013.01); *G01K 3/06* (2013.01); *G06F 1/3296* (2013.01); *G06F 3/0619* (2013.01); *G06F 3/0625* (2013.01); *G06F 3/0659* (2013.01); *G06F 3/0688* (2013.01)

(58) Field of Classification Search
CPC .................................................. G06F 11/1068
USPC .................................. 714/764, 765, 768, 770
See application file for complete search history.

(56) References Cited

U.S. PATENT DOCUMENTS

2016/0004458 A1\* 1/2016 Micheloni ............ G06F 3/0659
711/103

FOREIGN PATENT DOCUMENTS

JP  2016-206981 A  12/2016

\* cited by examiner

*Primary Examiner* — Fritz Alphonse
(74) *Attorney, Agent, or Firm* — Procopio, Cory, Hargreaves & Savitch LLP

(57) ABSTRACT

It is assumed that at least one of the plurality of nonvolatile semiconductor memory devices is a nonvolatile semiconductor memory device (hereinafter, referred to as a first memory device) in a low power consumption state in which error check processing and refresh processing cannot be performed. A storage apparatus releases a low power consumption state of a first memory device at a timing according to a lapsed time after the first memory device is in the low power consumption state and an estimated ambient temperature of the first memory device at the lapsed time. When the low power consumption state is released, the first memory device executes the error check processing and the refresh processing.

15 Claims, 8 Drawing Sheets

FIG. 8

CONTROL TABLE 800

| PRIORITY ⤴810 | RESTART CONDITION ⤴820 | SCHEDULE ⤴830 |
|---|---|---|
| HIGHEST | IMMEDIATELY | COMPLETION AS SOON AS POSSIBLE |
| HIGH | $P \geq (D1-K)$ | COMPLETION IN $(D1 - P)$ DAYS |
| MIDDLE | $P \geq (D2-K)$ | COMPLETION IN $(D2 - P)$ DAYS |
| LOW | $P \geq (D3-K)$ | COMPLETION IN $(D3 - P)$ DAYS |

STORAGE APPARATUS AND MEMORY DEVICE CONTROL METHOD

TECHNICAL FIELD

The present invention generally relates to a control of a nonvolatile semiconductor memory device.

BACKGROUND ART

Conventionally, a storage apparatus has a storage device having a nonvolatile storage medium, such as a magnetic disk and an optical disk, which can be randomly accessed. Recently, the storage apparatus including a plurality of small-sized disk drives has been becoming popular.

In recent years, with the progress of the semiconductor technology, a batch erasable nonvolatile semiconductor memory has been developed. Examples of such a nonvolatile semiconductor memory include a flash memory. Hereinafter, a storage device using a flash memory as a storage medium is referred to as a "flash memory device", and a storage apparatus having a flash memory device is referred to as a "flash storage apparatus".

Compared with the storage apparatus having the plurality of small-sized disk drives, it is considered that the flash storage apparatus can further save power, provide a faster access time, and the like.

However, if a long time passes after data is written into the flash memory, a data error is gradually increased and thus there is a possibility that the data error cannot be corrected even by an error correction code. Therefore, if a predetermined time passes after data is written into a certain area in the flash memory, the flash memory device reads data from the area, and if there is an error in the data, the data error is corrected and then the data is moved to (written into) another area in the flash memory. This prevents data from being lost. Such processing is called "refresh processing".

It has been known that the data error in the flash memory increases rapidly as a frequency of rewriting data into the memory area increases. On the other hand, PTL 1 discloses a method of performing refresh processing at timing according to a degree of progress of a frequency of rewriting data in the flash memory.

CITATION LIST

Patent Literature

PTL 1: JP 2016-206981 A

SUMMARY OF INVENTION

Technical Problem

According to the technique disclosed in PTL 1, when the frequency of rewriting data in the flash memory is reduced, the frequency of performing the refresh processing is set to be reduced.

However, the increase speed of the data error in the flash memory does not depend only on the frequency of rewriting data in the flash memory. It has been known that after data is written, the higher the temperature of the environment in which the flash memory is installed, the faster the increase in the data error. That is, even when the frequency of rewriting data in the flash memory is reduced, if the flash memory is disposed in a high temperature environment, the data error increases quickly.

Therefore, if the frequency of performing the refresh processing is set to be reduced because the frequency of rewriting data in the flash memory is reduced, the error which cannot be corrected by the error correction code up to the next refresh processing is likely to occur, that is, the data is likely to be lost.

Further, it is considered that the flash storage apparatus has a large number of flash memory devices (the storage device using the flash memory as the storage medium). In order to reduce the power consumption, it is preferable to shut off a power supply for the flash memory device conforming to a predetermined condition (for example, not being set for a predetermined time) (at least, it is preferable not to perform internal processing such as refresh processing). The flash memory device for which the power supply is shut off is in the state in which the refresh processing cannot be performed, but in this state, may be left in the high temperature environment for a long period of time. Therefore, when the power supply is turned on, there is a possibility that data may have the errors which cannot be corrected even when the refresh processing is performed.

Such a problem may occur in the nonvolatile semiconductor memory other than the flash memory.

Solution to Problem

It is assumed that at least one of the plurality of nonvolatile semiconductor memory devices is a nonvolatile semiconductor memory device (hereinafter, referred to as a first memory device) in a low power consumption state in which error check processing and refresh processing cannot be performed. The storage apparatus releases a low power consumption state of a first memory device at a timing according to a lapsed time after the first memory device is in the low power consumption state and an estimated ambient temperature of the first memory device at the lapsed time. When the low power consumption state is released, the first memory device executes the error check processing and the refresh processing.

Advantageous Effects of Invention

According to the present invention, even if the environment of the nonvolatile semiconductor memory device in the low power consumption state is the high temperature environment, it is possible to prevent data in the nonvolatile semiconductor memory in the device from being lost.

BRIEF DESCRIPTION OF DRAWINGS

FIG. 8 is a diagram showing a restart control table.

DESCRIPTION OF EMBODIMENTS

Figure 1:
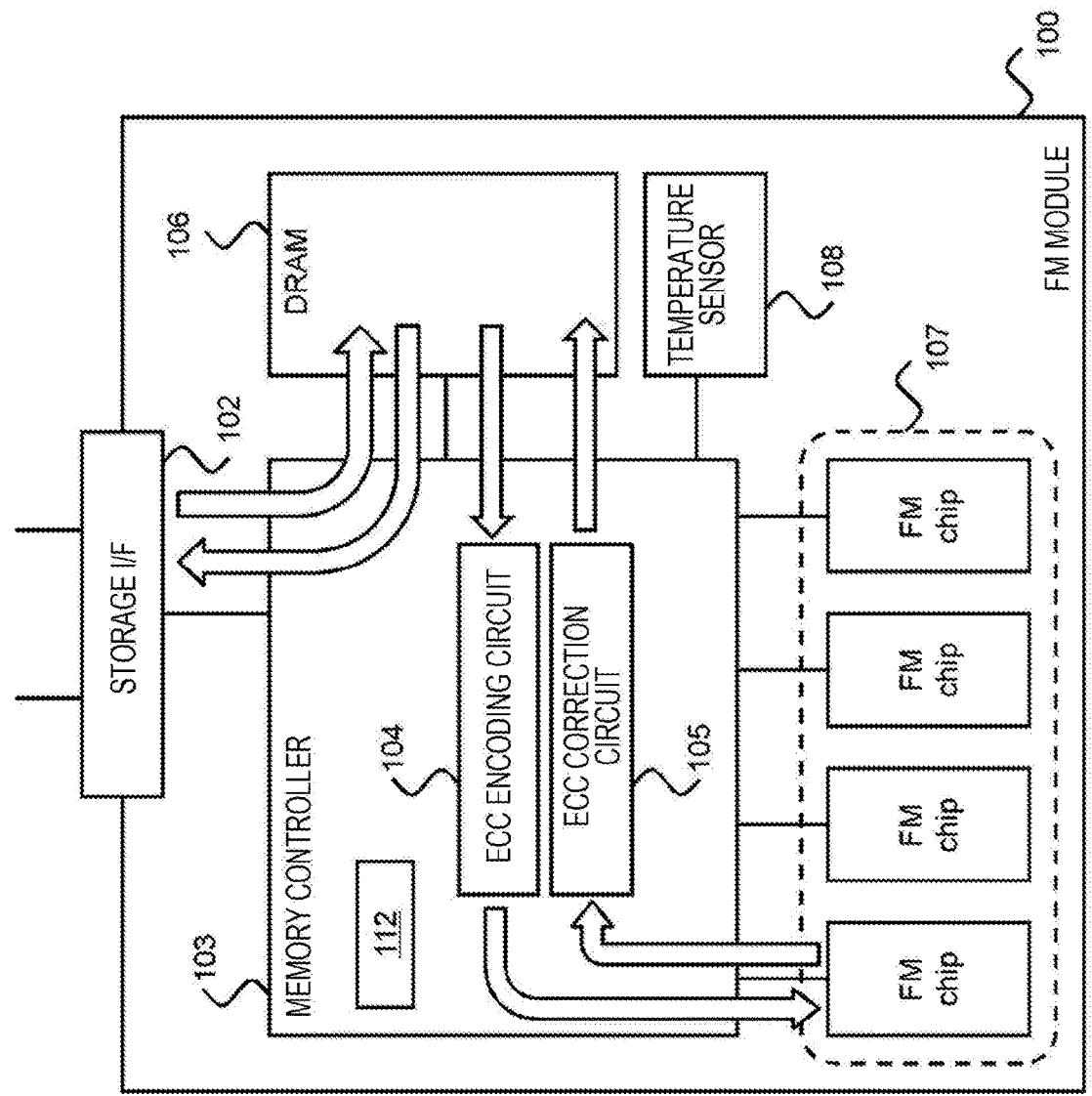
FIG. 1 is a diagram showing a configuration of a flash memory (FM) module.

In the following description, an "interface unit" includes one or more interface devices. The one or more interface devices may be one or more of the same kind of interface devices (for example, one or more network interface cards (NIC)) or two or more of different kinds of interface devices (for example, NIC and host bus adapter (HBA)).

In addition, in the following description, a "storage unit" includes one or more memories. At least one memory included in the storage unit may be a volatile memory. The storage unit is mainly used for processing by the processor unit.

In addition, in the following description, the "processor unit" includes one or more processors. At least one processor is typically a microprocessor such as a central processing unit (CPU). Each of the one or more processors may be a single core or a multi core. The processor may include a hardware circuit which performs some or all of the processings. The processor unit may include a hardware circuit (for example, field-programmable gate array (FPGA) or application specific integrated circuit (ASIC)) which performs some or all of the processing.

In addition, in the following description, a "storage apparatus" includes one or more physical storage apparatuses. The physical storage apparatus may be any apparatus having a function of storing data in the storage device. Therefore, the physical storage apparatus may be a computer (for example, a general-purpose computer) such as a file server. For example, at least one physical storage apparatus may execute a virtual computer (for example, virtual machine (VM)) or execute software-defined anything (SDx). As the SDx, for example, a software defined storage (SDS) (an example of a virtual storage apparatus) or a software-defined datacenter (SDDC) can be adopted. In addition, for example, at least one physical storage apparatus (computer) may have a hypervisor. The hypervisor may generate a server virtual machine (VM) operating as a server and a storage VM operating as storage. The server VM may operate as a host computer which issues an I/O request, and the storage VM may operate as a storage controller which performs I/O on FMPK in response to the I/O request from the server VM.

In addition, in the following description, when the same kind of elements are described without being distinguished, common reference numerals are used, and when the same kind of elements need to be distinguished, different reference numerals are sometimes used. For example, when FM modules are not distinguished, the FM modules are referred to as "FM module 100", and when the FM modules are distinguished, the FM modules are referred to as "FM module 100A" and "FM module 100B".

[1] Configuration of Computer System Including Storage Apparatus According to Embodiment of the Present Invention First, a configuration of a computer system including a storage apparatus according to an embodiment of the present invention will be described with reference to FIG. 2.

The computer system includes a storage apparatus 200, a host 221, a management terminal 220, and a storage area network (SAN) 210.

The storage apparatus 200 interprets a request (typically, a read/write request) transmitted from the host 221 and reads/writes data from/in a storage area of the storage apparatus 200. The storage apparatus 200 includes a storage controller 270, a plurality of flash memory modules (hereinafter, referred to as an FM module) 100, and a plurality of connectors (hereinafter, simply referred to as a connector) 260. The storage controller 270 includes a host interface (I/F) 232, a storage I/F 252, a maintenance I/F 230, a CPU 241, and a memory 242. The I/Fs 232, 252, and 230 are an example of an interface unit. The memory 242 is an example of a storage unit. The CPU 241 is an example of a processor unit. The FM module 100 is an example of a flash memory (FM) device.

The host I/F 232 is an interface for receiving data and control commands from the host 222. In addition, the storage I/F 252 is an interface for transmitting the data or the control commands to the FM module 100. In addition, the maintenance I/F 230 is an interface for being connected to the management terminal 220 to receive the control commands and the like related to management or maintenance from the management terminal 220.

The CPU 241 functions as an arithmetic processing apparatus and has a function of controlling the overall operation of the storage apparatus 200 in accordance with various programs or operation parameters stored in the memory 242.

Specifically, for example, the CPU 241 processes a user data input/output (data I/O) between the storage apparatus 200 and the host 222. That is, the CPU 241 issues a write command to the FM module 100 to write user data in the FM module 100. In addition, the CPU 241 issues a read command to the FM module 100 to read the user data in the FM module 100.

In addition, for example, the CPU 241 issues a command to the FM module 100 to notify information to the FM module 100 and acquire information from the FM module 100. A start or stop of the supply of power to the FM module 100 is also controlled by the CPU 241.

The memory 242 temporarily stores control information or management information, user data to be written in the FM module 100, and the user data read from the FM module 100, in addition to various programs and operation parameters.

The number of FM modules 100 mounted in the storage apparatus 200 may vary. The FM module 100 is connected to the storage I/F 252 via the connector 260, and power is supplied from the connector 260. In addition, data received from the host 222 via the connector 260 and each control command are input to the FM module 100, and data is output from the FM module 100 via the connector 260. The internal configuration of the FM module 100 will be described below with reference to FIG. 1. In the present embodiment, the FM module 100 is configured to be built in the storage apparatus 200, but the configuration of the FM module 100 is not limited to this example, and the FM module 100 may be disposed separately from the storage apparatus 200.

The host 222 is connected to the storage apparatus 200 via the SAN 210, and transmits a data read/write request to the storage apparatus 200. In addition, the host 222 is a computer apparatus having information processing resources such as a CPU and a memory, and is constituted by, for example, a personal computer, a workstation, a mainframe, or the like. For communication between the host 222 and the storage apparatus 200, for example, a block protocol such as a small computer system interface (SCSI) is used. In addition, the host 222 may include information input apparatuses such as a keyboard, a switch or a pointing device, and a microphone, and information output apparatuses such as a monitor display and a speaker.

The management terminal 220 is a computer apparatus including information processing resources such as a CPU and a memory, and is constituted by, for example, a hardware computer, a workstation, a mainframe, or the like. The CPU functions as an arithmetic processing apparatus, and controls the operation of the management terminal 220 according to programs, operation parameters or the like which are stored in the memory. In addition, the management terminal 220 includes the information input apparatuses such as the keyboard, the switch or the pointing device, and the microphone, and the information output apparatuses such as the monitor display and the speaker, and is an apparatus which manages the storage apparatus 200 and the like according to an input from an operator or the like.

Figure 2:
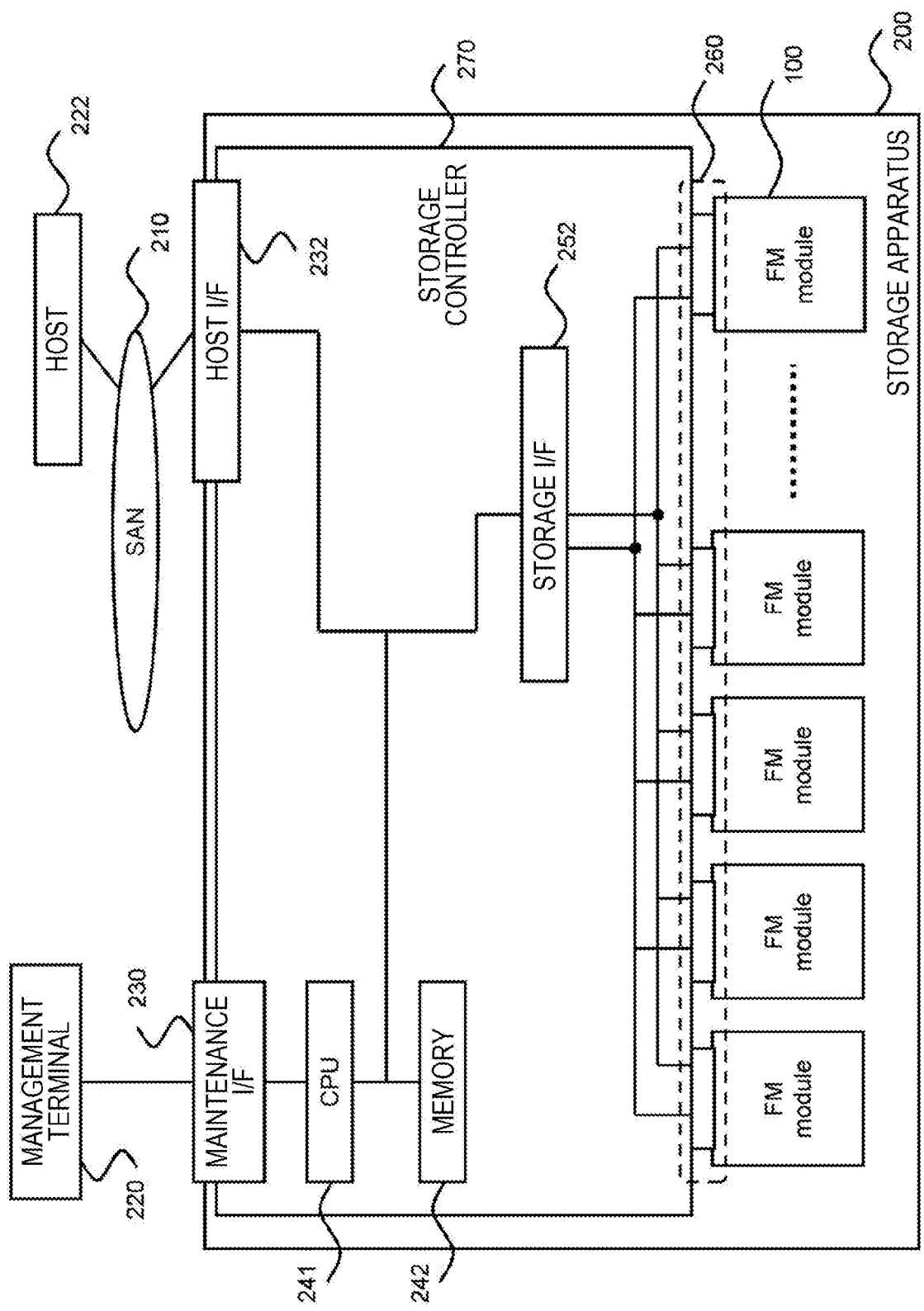
FIG. 2 is a diagram showing a configuration of a computer system including a storage apparatus.

At least one of the host 222, the host I/F 232, the storage I/F 252, the maintenance I/F 230, the memory 242, the CPU 241, and the connector 260 is not limited to the number illustrated in FIG. 2. Similarly, standards of the connector 260 and the I/Fs 232, 252 and 230 are not limited to specific ones. For example, a fiber channel (FC), SCSI, an internet small computer system interface (iSCSI), a serial attached SCSI (SAS), and the like can be exemplified as representative standards applied to the SAN 210.

[2] Characteristics and Handling of Flash Memory

Characteristics and handling of the flash memory which is the storage medium of the FM module 100 will be described.

The flash memory is generally a NAND type flash memory and has a feature that a minimum erase unit is larger than a minimum write unit. Specifically, for example, the flash memory is composed of a plurality of blocks, in which a plurality (for example, 512) of pages are provided in each block, data is erased in a block unit, and data is read and written in a page unit. A size of the page is, for example, 16 KB bytes. The flash memory cannot directly overwrite data due to its characteristics. That is, the flash memory is a write-once type. That is, when a logical area to which a physical page (hereinafter, page) is allocated is a write destination, a new empty page is allocated to a write destination logical area instead of the allocated page, and data is written in the newly allocated page. For each logical area, data (that is, the latest data) written in the recently allocated page is a "valid data", the page in which the valid data is written is a "valid page", data stored in a page allocated in the past is an "invalid data", and a page in which the invalid data is written is an "invalid page". In addition, a page which is neither the valid page nor the invalid page and can store new data is an "empty page". In the case of rewriting data, the FM module 100 performs refresh processing which retreats all valid data stored in a block including the data to another block and erases an original block.

The flash memory has a feature that a frequency of erasing a block (erasing data from a block) is limited. If the rewriting of data concentrates on one block and thus the frequency of erasing the block exceeds the guarantee number (the upper limit of the erase frequency), there is a problem in that data cannot be erased, the block cannot be used later, and the number of usable blocks is reduced. Therefore, in order to prevent the erasing processing from concentrating on a specific block, it is common to perform leveling processing on the erase frequency by moving data having a high rewriting frequency from a block with a large number of erase frequencies to a block with a small number of erase frequencies, or the like.

In addition, the flash memory has a feature that data error increases with the passage of time even if data is retained in a page once written. In order to avoid the data loss due to the fact that the data error cannot be corrected, a parity of data to be written is calculated based on an error correction code (ECC) and added before the data is written (this is referred to as ECC encoding). In order to prevent the data error from exceeding the correctable range, data which has passed a predetermined time after the writing is read and corrected using the parity (this is referred to as ECC correction), and the corrected data is moved to another page to be in a state in which the data error is reduced (refresh processing). Considering the leveling of the erase frequency described above, in the refresh processing, it is preferable to select the block having a small number of erase frequencies as a moving destination as the data having a large number of rewriting frequencies is increased.

The FM module 100 using the flash memory as the storage medium dynamically associates the logical address provided to a host apparatus in the FM module 100 with the physical address of the storage area on the actual flash memory for the leveling of the erase frequency of the block and the refresh of the stored data. The physical address to be allocated to the logical address specified at the time of writing the data is determined, and the correspondence relationship between the logical address and the physical address is changed. As a result, it is not necessary for the host apparatus to be aware of the physical address in which new data is written, and data can be updated by writing new data in the same logical address as the logical address of the old data.

[3] Configuration of FM Module 100

A configuration of the FM module 100 will be described with reference to FIG. 1.

The FM module 100 is configured to include a storage I/F 102, a memory controller 103, a plurality of NAND type flash memories 107, a dynamic random access memory (DRAM) 106 which is a volatile memory, and a temperature sensor 108. The memory controller 103 includes an ECC encoding circuit 104 and an ECC correction circuit 105.

The memory controller 103 is connected to the storage I/F 102, the flash memory 107, the DRAM 106, and the temperature sensor 108, and includes a microprocessor 112 which controls these components. The microprocessor 112 interprets the contents of a read/write command received through the storage I/F 102, transmits/receives read/write data, encodes data and corrects errors by the ECC encoding circuit 104 and the ECC correction circuit 105, and executes data transmission between the flash memory 107 and the DRAM 106.

The storage I/F 102 is an interface mechanism for connecting to apparatuses or the like outside the FM module 100, receives user data from the outside according to a write command issued from the outside, or transmits the user data to the outside according to a read command issued from the outside.

The ECC encoding circuit 104 is an arithmetic unit mounted in the memory controller 103 as hardware (logical circuit), and generates data with parity in order to be able to correct an error generated in the data stored in the flash memory 107 later.

The ECC correction circuit 105 is the arithmetic unit mounted in the memory controller 103 as hardware (logical circuit), corrects the data error included in the data with parity read from the flash memory 107, and generates the corrected data.

The DRAM 106 temporarily stores the write data received from the outside. In addition, the DRAM 106 temporarily stores the read data transmitted to the outside. In addition, the DRAM 106 functions as a write buffer which temporarily stores data to be written in the flash memory 107. In addition, the DRAM 106 functions as a read buffer which temporarily stores data to be read from the flash memory 107.

The temperature sensor 108 is mounted to measure the temperature inside the FM module 100, and is configured so that the memory controller 103 can acquire the measured temperature.

The memory controller 103 outputs temperature information including temperature measured by the temperature sensor 108 and a measurement time to the outside of the storage I/F 102 according to a temperature acquisition command issued from the outside of the storage I/F 102 by the CPU 241. It should be noted that the measurement time is a lapsed time based on a power supply starting time of the FM module 100 as a reference (zero).

The memory controller 103 continuously acquires the measurement temperature from the temperature sensor 108 at regular time intervals. The interval (measurement cycle) is specified by the measurement control command issued from the outside of the storage I/F 102 by the CPU 241. In addition, the temperature information output by the temperature acquisition command is a temperature log. The temperature log indicates a time-series change in temperature, specifically, one or more temperature time sets. Each temperature time set is a set of the temperature measured by the temperature sensor 108 and the measurement time since the last time the temperature acquisition command was issued. The measurement time follows the measurement cycle specified by the measurement control command.

[4] Physical Structure of Storage Apparatus 200

Figure 3:
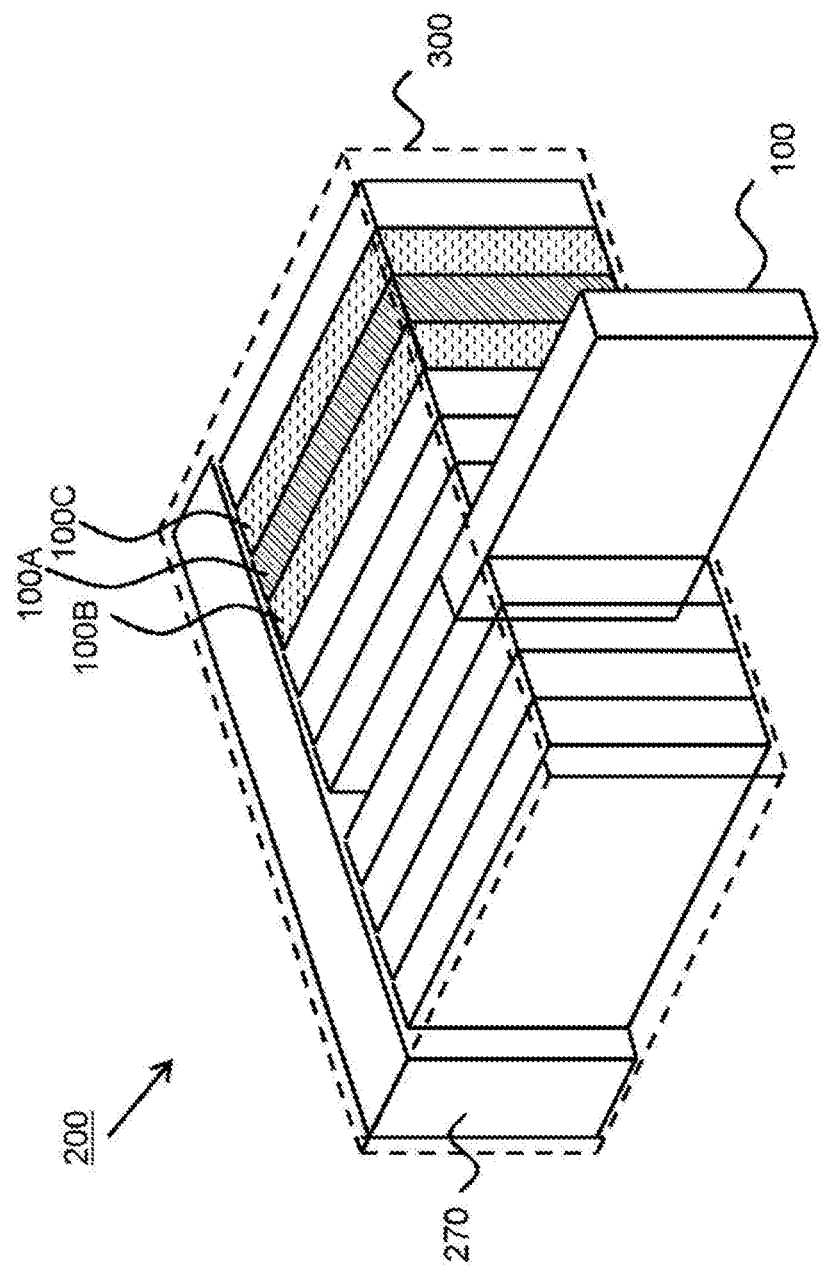
FIG. 3 is a schematic diagram of an appearance of the storage apparatus.

FIG. 3 is a schematic diagram of an appearance of the storage apparatus 200.

The storage controller 270 is disposed on a rear side in a physical enclosure 300, and a plurality of connectors 260 for connecting to the FM module 100 are arranged on a front side of the physical enclosure 300 side by side in a lateral direction (left and right direction). By pulling or pushing the FM module 100 from the front side of the physical enclosure 300 by hand, it is possible to insert and remove the FM module 100 into and from the connector 260.

The start and stop of the supply of power to the FM module 100 can be made even when the FM module 100 is connected to one of the connectors 260. That is, the power supply to the FM module 100 can be stopped without physically extracting the FM module 100. In order to suppress the power consumption, the storage apparatus 200 temporarily stops the supply of power to the FM module 100 which does not require access. For example, the supply of power to the FM module 100 operating for backing up data once a day may be stopped for time other than the time when the backup is performed. In addition, the supply of power to an FM module 100 prepared as a spare against the occurrence of failure may be stopped until the operating FM module 100 fails.

[5] Data Error Characteristics of Flash Memory

Data error characteristics of the flash memory 107 mounted in the FM module 100 will be described with reference to FIG. 4.

As described above, by executing refresh processing, the flash memory 107 can reduce errors included in data (in the case where there is no failure in a memory cell, errors can be reduced to zero), but a data error is increased again with the passage of time even after the refresh processing. Generally, it is known that the increasing rate becomes fast as the temperature of the environment in which the flash memory 107 is disposed after data writing increases. Hereinafter, three examples of T1° C., T2° C., and T3° C. as temperature are taken (T1<T2<T3). In addition, three examples of D1 days, D2 days, and D3 days as the number of days lapsed from the refresh processing are taken (D1<D2<D3).

For example, when the environmental temperature is T1° C., a data error rate reaches $X_{th}$ (error rate that can be corrected by an ECC correction circuit 105) within D3 days. When the environmental temperature is T2° C., the data error rate reaches $X_{th}$ in a shorter D2 days. When the environmental temperature is T3° C., the data error rate reaches $X_{th}$ in a much shorter D1 days.

[6] Policy Based On Estimated Ambient Temperature (Hereinafter, Ambient Temperature) Of FM Module 100

When the temperature of the environment in which the flash memory 107 is disposed is high, the increase in data error becomes fast. Therefore, the memory controller 103 in the FM module 100 increases the frequency of performing the error check processing (when a data error is found in error check processing) and the refresh processing. As a result, a time interval at which each memory block is checked is shortened, and the data error rate of the flash memory 107 is controlled not to exceed $X_{th}$. The error check processing is processing of checking the number of errors which is the number of errors in data read from a target area (a certain physical memory area in the flash memory 107). The refresh processing is processing of moving error-corrected data (another physical memory area in the flash memory 107) to another area different from a target area when the number of errors is equal to or greater than a predetermined number. The target area is, for example, a physical area allocated to a logical address range (a logical area having a relatively high read frequency in the flash memory 107) in which the read is performed at a high frequency.

However, in the case of performing the error check processing and the refresh processing at a high frequency, a processor resource, a memory resource, and a bus band for processing the read/write command from the outside of the FM module 100 is seized by the error check processing and the refresh processing, which is a factor of degrading the read/write performance of the FM module 100. Therefore, in the present embodiment, when the temperature of the environment in which the flash memory 107 is disposed is low, the memory controller 103 moderately reduces the frequency of performing the error check processing and the refresh processing. As a result, it is possible not to unnecessarily lower the read/write performance of the FM module 100.

When power is supplied to the FM module 100, the memory controller 103 can know the temperature of the environment in which the flash memory 107 is disposed by the temperature sensor 108 installed in the memory controller 103. However, when power is not supplied to the FM module 100, since the internal memory controller 103 is not operated, the memory controller 103 cannot directly know the temperature of the environment in which the internal flash memory 107 is disposed Therefore, in the present embodiment, the storage controller 270 estimates an environmental temperature of a power-interrupted FM module (stopping FM module which is not supplied with power) 100, based on the temperature acquired from the temperature sensor 108 of the operating FM module (FM module which is supplied with power) 100 and a relative position of the operating FM module with respect to a position of the power-interrupted FM module. Specifically, in the present embodiment, the environmental temperature of the power-interrupted FM module 100 is based on the temperature acquired from the temperature sensor 108 mounted in the operating FM module 100 closest (for example, adjacent) to the power-interrupted FM module 100. The temperature measured by the temperature sensor 108 in the operating FM module is the temperature around the power-interrupted FM module 100. From the temperature, the storage controller 270 estimates the temperature of the environment in which the flash memory 107 in the power-interrupted FM module 100 is disposed. For example, if the internal temperature of two operating FM modules (operating FM modules) 100B and 100C adjacent to an FM module (power-interrupted FM module) 100A is 45° C. and 44° C., respectively, it is estimated that the internal temperature of the stopping FM module 100A sandwiched between the two operating FM modules 100B and 100C will not exceed 45° C.

In FIG. 3, if the FM modules 100B and 100C adjacent to the FM module 100A are supplied with power, the memory controller 103 measures the temperature by the temperature sensor 108 in each of the FM modules 100B and 100C. For each of the FM modules 100B and 100C, the temperature information (temperature log) is transmitted from the memory controller 103 to the storage controller 270 in response to the above-described temperature acquisition command from the storage controller 270. When the FM module 100A is again supplied with power to start, it is unclear under what environmental temperature the flash memory 107 in the FM module 100A is exposed while the FM module 100A is stopped, such that it is possible to determine how often the error check processing and the refresh processing are performed after the starting If such a determination cannot be made and thus the error check processing and the refresh processing are performed unconditionally and at a high frequency, unnecessary degradation in the read/write performance is caused as described above. Therefore, the storage controller 270 performs a frequency determination which is a determination on the frequency of the error check processing and the refresh processing using the temperature information obtained from the FM modules 100B and 100C. The FM module 100A receives the determination result (error check priority described below) from the storage controller 270 and performs the error check processing and the refresh processing at an appropriate frequency based on the determination result. When there is a difference in the temperature information (for example, highest temperature) obtained from the FM modules 100B and 100C, the above-described frequency determination is performed using the higher temperature. However, the handling of the temperature information obtained from the FM modules 100B and 100C is not limited thereto. The storage controller 270 may use an intermediate value between the two temperatures, a precise heat conduction calculation, or a temperature estimated by a model equation obtained from experiments.

Figure 5:
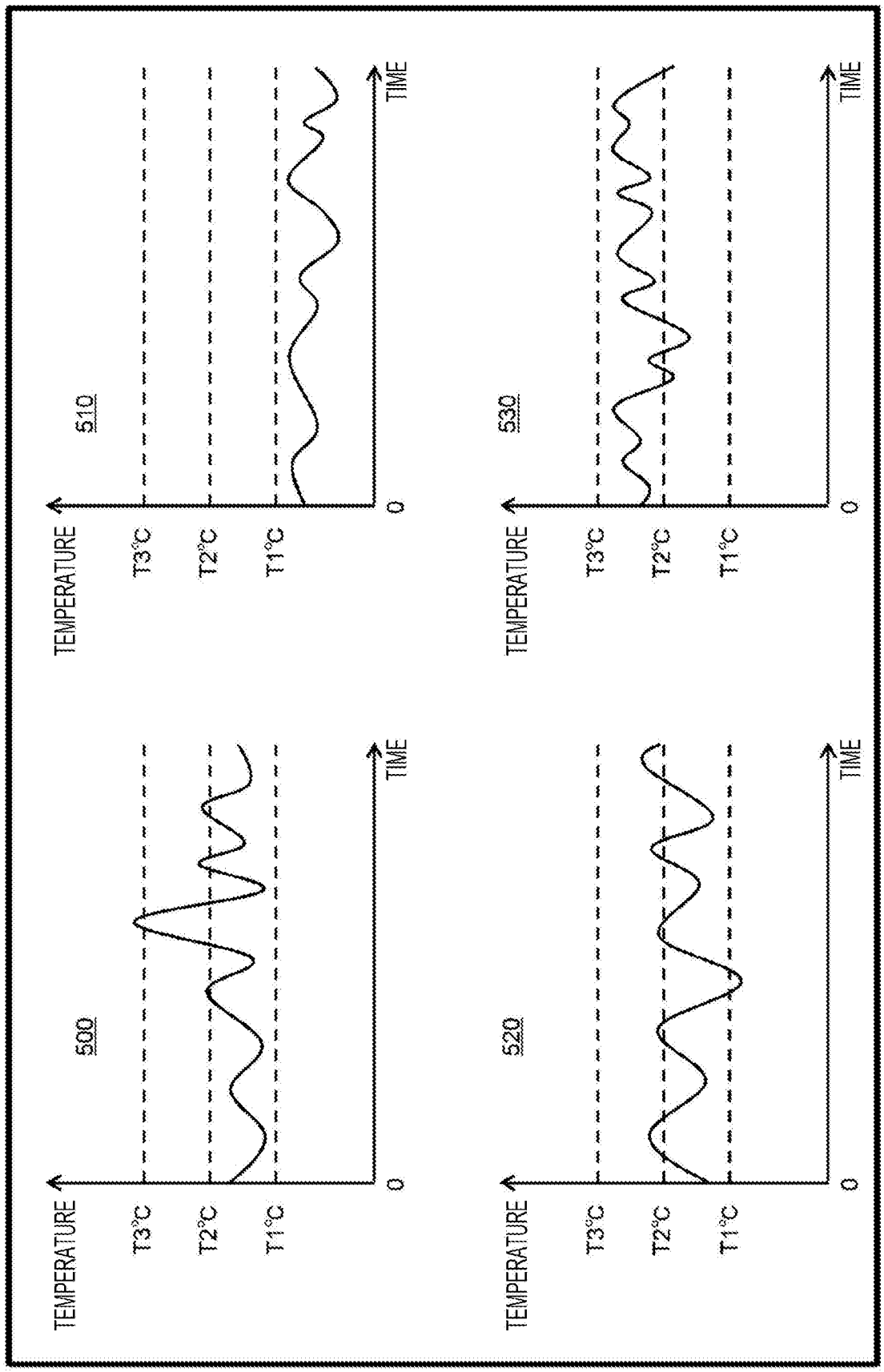
FIG. 5 is a diagram showing an example of a time change in an ambient temperature of a flash memory module.

FIG. 5 shows four cases of temperature-time series change according to at least one of the temperature information (temperature log) acquired by the temperature acquisition command from the FM modules 100B and 100C. As described above, the temperature acquisition command is not a command for acquiring the temperature at the time of issuing the command, but eventually, is a command which issues the temperature acquisition command to the FM module 100 to acquire the temperature information (temperature log) from the FM module 100 and allows the FM module 100 to collectively acquire the temperature logs accumulated by periodical measurement. Therefore, the storage controller 270 does not need to issue a command to the FM module 100 at high frequency in order to acquire the temperature, and as a result, the performance of the read/write processing of the user data can be prevented from deteriorating.

A case 500 is a case in which the ambient temperature is equal to or higher than T3° C. while the FM module 100A is stopped. In this case, it is desirable that the FM module 100A immediately performs the error check processing and the refresh processing immediately after the starting.

A case 510 is a case in which the ambient temperature is equal to or higher than T1° C. while the FM module 100A is stopped. This case is a case in which the data error is the most difficult to occur. For this reason, in this case, the number of days to stop the FM module 100A (the number of days to stop the FM module 100A without being supplied with power) may be D3 days which is the maximum allowable number of days.

A case 520 is a case in which the ambient temperature is not equal to higher than T3° C. while the FM module 100A is stopped but is equal to or higher than T1° C., and an average temperature is lower than T2° C. In this case, the number of days to stop the FM module may be D2 days.

A case 530 is a case in which the ambient temperature is not equal to higher than T3° C. while the FM module 100A is stopped but is equal to or higher than T1° C., and an average temperature is equal to or higher than T2° C. In this case, the number of days to stop the FM module may be D1 days.

When the flash memory according to the present embodiment is disposed under the environmental temperature which is equal to or higher than of T3° C., the data error increases at a high speed. Therefore, the storage controller 270 determines that for the case 500, the error check processing and the refresh processing after the starting on the mounted flash memory is terminated as soon as possible.

Figure 4:
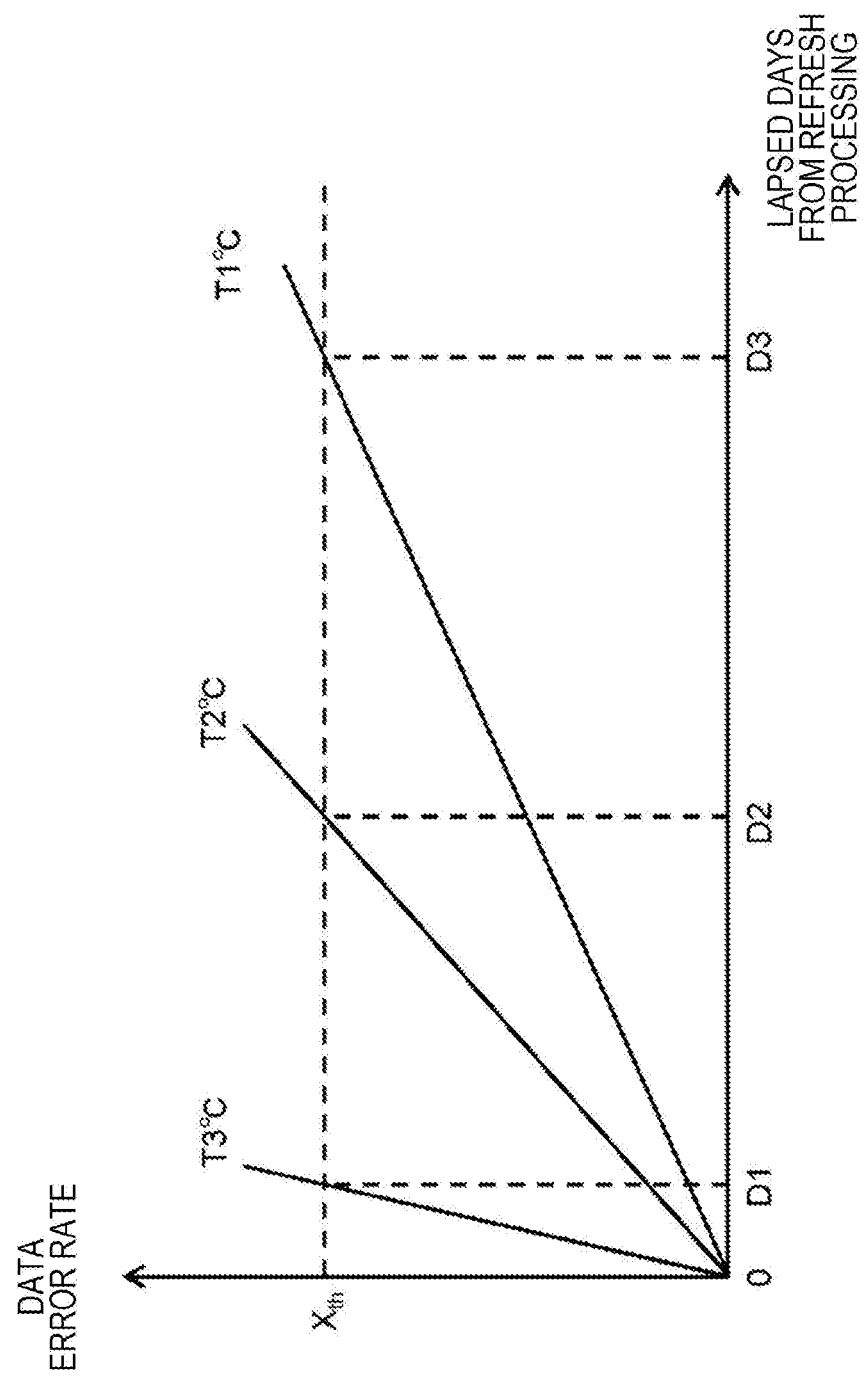
FIG. 4 is a diagram showing an example of error characteristics of a flash memory.

From a characteristic graph in FIG. 4, at least D3 days after the refresh processing is performed under the environmental temperature of T1° C. is a range in which the data error rate can be corrected. Therefore, the storage controller 270 determines that for the case 510, the flash memory is disposed at a temperature lower than T1° C. and then the error check processing and the refresh processing after the starting are terminated by D3 days after the previous refresh processing.

From the characteristic graph in FIG. 4, at least D2 days after the refresh processing is performed under the environmental temperature of T2° C. is a range in which the data error rate can be corrected. Therefore, the storage controller 270 determines that for the case 520, the flash memory is disposed at a temperature which does not reach T3° C. or higher and is lower than T2° C. on average and then the error check processing and the refresh processing after the starting are terminated by D2 days after the previous refresh processing.

From the characteristic graph in FIG. 4, at least D1 days after the refresh processing is performed under the environmental temperature of T3° C. is a range in which the data error rate can be corrected. Therefore, the storage controller 270 determines that for the case 530, the flash memory is disposed at a temperature which does not reach T3° C. or higher and is equal to or lower than T2° C. on average and then the error check processing and the refresh processing after the starting are terminated by D1 days after the previous refresh processing.

Figure 6:
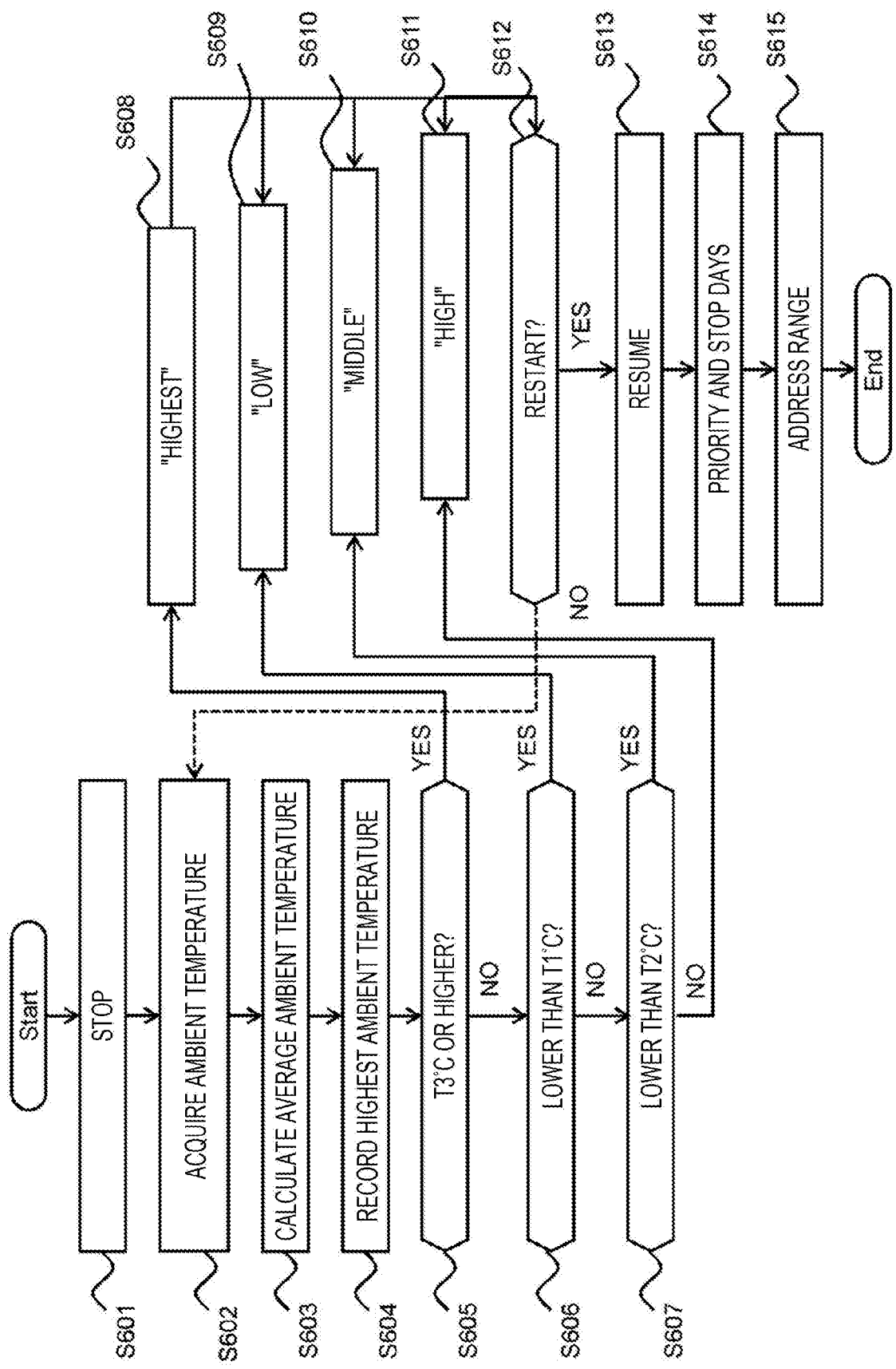
FIG. 6 is a flowchart of a process performed by a storage controller.

[7] Processing Performed by Storage Controller when Stopping and Resuming Supply of Power to FM Module FIG. 6 shows a flowchart of a process performed when the storage controller 270 stops the supply of power to the FM module 100 and starts the supply of power to the FM module 100 again.

In order to save power, the storage controller 270 stops the supply of power to the FM module 100A which is not scheduled to be used for a while (S601). Then, the temperature information (temperature log) is acquired by issuing the temperature acquisition command for each of the operating FM modules 100B and 100C which are adjacent to the FM module 100A (S602).

Next, the storage controller 270 calculates the average ambient temperature after stopping the supply of power to the FM module 100A by using the temperature information acquired in S602 (S603) and also records the highest ambient temperature after stopping the supply of power to the FM module 100A (S604). The average ambient temperature is an example of a temperature based on a plurality of ambient temperatures (a plurality of ambient temperatures in the time lapsed from the stopping of the supply of power to the FM module 100A) after the supply of power to the FM module 100A was stopped. Instead of the average ambient temperature, a median value of the plurality of temperatures may be adopted.

If the highest ambient temperature in S603 is equal to or higher than T3° C. (S605: YES), the storage controller 270 sets the error check priority to "highest" (S608), and the process proceeds to S612.

If the highest ambient temperature is not T3° C. or higher but is lower than T1° C. (S605: NO and S606: YES), the storage controller 270 sets the error check priority to "low" (S609), and the process proceeds to S612.

If the highest ambient temperature in S603 is not T3° C. or higher and is not lower than T1° C., but the average ambient temperature in S604 is lower than T2° C. (S605: NO, S606: NO, and S607: YES), the storage controller 270 sets the error check priority to "middle" (S610), and the process proceeds to S612.

If the highest ambient temperature in S603 is not 13° C. or higher and is not lower than T1° C., but the average ambient temperature is lower than T2° C. (S605: NO, S606: NO, and S607: NO), the storage controller 270 sets the error check priority to "high" (S611), and the process proceeds to S612.

In S612, the storage controller 270 determines whether or not the FM module 100A to which the supply of power is stopped is restarted. The satisfaction of the condition for determining that the operation is restarted, that is, the satisfaction of restart condition means that at least one of a first type condition (condition that the current time is a scheduled time to resume the use of the FM module 100A) and a second type condition (condition that the data error rate of the flash memory 107 in the FM module 100A is estimated to be the state where the FM module 100A is started to start the error check processing and the refresh processing) is satisfied. In the following description, the second type condition is referred to as a "forced restart condition".

If the determination result in S612 is true (S612: YES), the storage controller 270 proceeds to S613. If the determination result in S612 is false (S612: NO), the process returns to S602 in order for storage controller 270 to acquire the ambient temperature of the FM module 100A again.

In S613, the storage controller 270 starts the supply of power to the FM module 100A. Then, the storage controller 270 notifies, by a command, the started FM module 100A of the error check priority set in S608 to S611 and the number of stop days which is the number of days to stop the FM module 100A (S614). In addition, the storage controller 270 notifies, by a command, logical address range information which is information indicating the logical address range (for example, logical address range in which a relatively high read frequency (for example, the highest read frequency) is high among the logical address spaces provided by the FM module 100A) in which data read from the FM module 100A at a high frequency is stored (S615). The FM module 100A performs a control according to the control information including the error check priority, the number of stop days, and the logical address range information.

[8] Processing Performed by FM Module to which Power is Supplied Again

Figure 7:
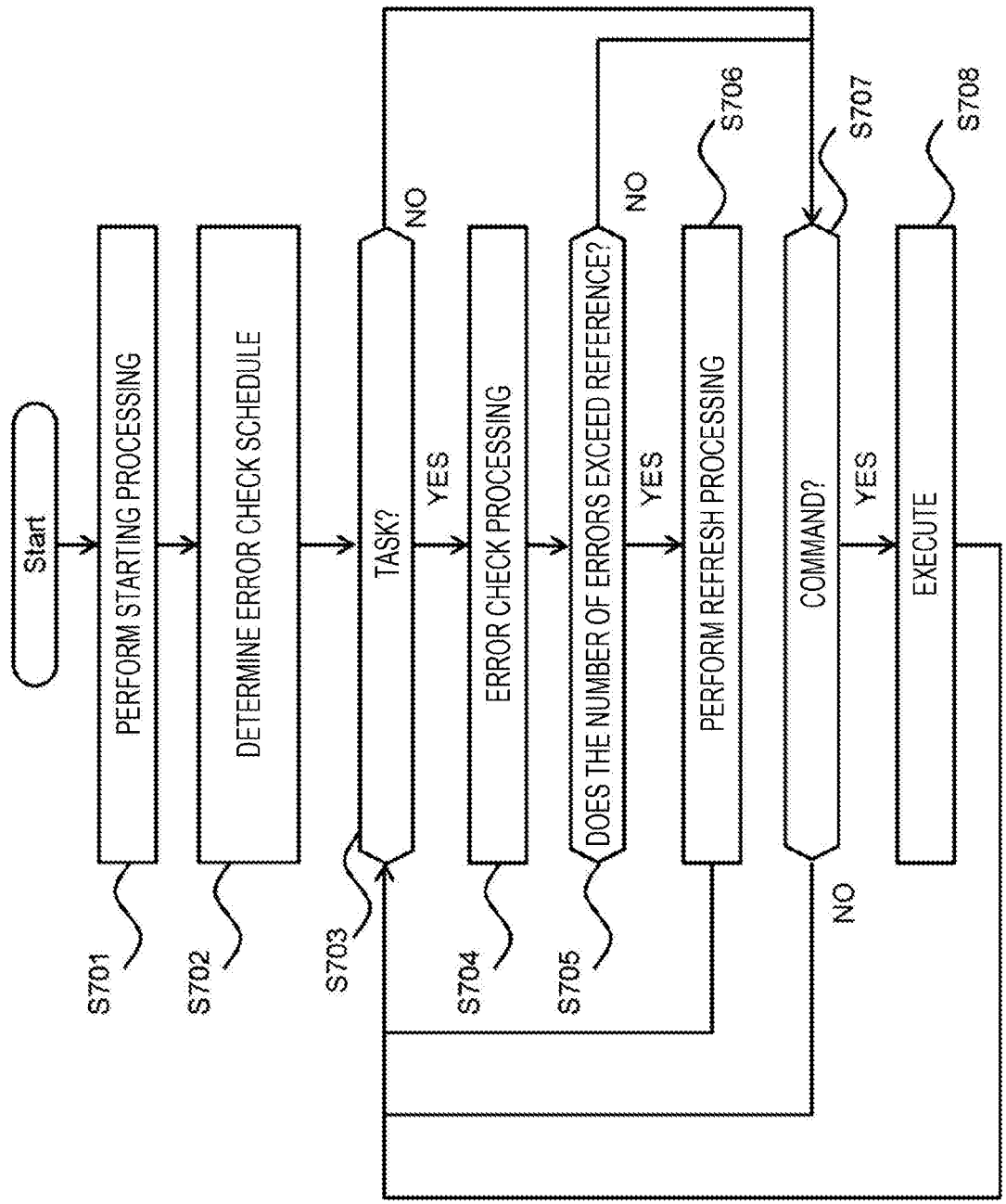
FIG. 7 is a flowchart of a process performed by the FM module.

FIG. 7 shows a flowchart of a process performed when the FM module 100A to which power is supplied again in the above S613 is started.

The memory controller 103 in the FM module 100A performs power-up starting processing in response to the resumption of the supply of power (S701). The "power-up starting processing" is initialization processing necessary for enabling a command access from the outside by the FM module 100A. As a result of this initialization processing, processing according to a command from the outside becomes possible.

Next, the memory controller 103 determines an error check schedule based on the information according to a command notifying the error check priority and the logical address range information in the above steps S614 and S615 (S702). The error check schedule is a processing plan showing at what timing the error check is performed on the area of the flash memory 107. However, as the area to be subjected to the error check, the area indicated by the physical address allocated to the logical address range indicated by the logical address range information of S615 is preferentially selected (for example, as an area first targeted). By performing the error check processing and the refresh processing on data having a high read frequency as soon as possible, there is a high possibility that the number of errors detected at the time of reading is reduced. In the present embodiment, a low-density parity-check (LDPC) code is adopted as the error correction code. Currently, the LDPC code has higher correction capability than the BCH code, but there is a feature that it takes more time to correct as the number of errors increases. By this priority selection, a probabilistic expectation value of the time required for error correction of data to be read is reduced. Therefore, the response performance of the read command after the starting of the FM module 100A is improved.

After S702, the memory controller 103 performs the error check processing and the refresh processing according to the error check schedule determined in S702. The execution of this processing is asynchronous with the command from the outside of the FM module 100A.

The memory controller 103 determines whether there is an error check task to be executed based on the error check schedule (S703). When the determination result in S703 is false (S703: NO), the process proceeds to S707. When the determination result in S703 is true (S703: YES), the memory controller 103 performs the error check processing on a predetermined target area (for example, an area indicating the physical address allocated to the logical address range indicating the logical address range information) in the flash memory 107 (S704). If the number of errors exceeding the reference is detected in the target area by the error check processing (S705: YES), the memory controller 103 executes the refresh processing (S706), and when the number of errors is equal to or smaller than the reference (S705: NO), the memory controller 103 proceeds to S707 without performing the refresh processing.

In S707, the memory controller 103 determines whether there is a command received from the outside. If the determination result in S707 is false (S707: NO), the process returns to S703 in order to the memory controller 103 to perform the next error check processing according to the error check schedule. If the determination result in S707 is true (S707: YES), the memory controller 103 executes processing (for example, read or write of data) according to the command (S708). When the command processing is terminated, the process returns to S703.

As described above, the memory controller 103 performs the error check processing and the refresh processing on the flash memory 107 asynchronously with processing according to the command received from the outside.

[9] Forced Restart condition and Error Check Schedule FIG. 8 shows a control table.

A restart control table 800 is a logical table showing the relationship between the forced restart condition and the error check schedule. Specifically, in the present embodiment, a table including a priority condition 810 and a timing condition 820 is held by the storage controller 270 (for example, the memory 242), and a table including the priority condition 810 and a schedule 830 is held by the memory controller 103 (for example, the DRAM 106) of each FM module 100. Each of the plurality of forced restart conditions includes the priority condition 810 and the timing condition 820. The forced restart condition is an example of a release condition that is a condition for releasing the low power consumption state. Since the error check priority is uniquely determined from the condition that the change in the ambient temperature is suitable, the priority condition 810 can also be referred to as a temperature condition.

The priority condition 810 is information indicating the condition as the error check priority. The timing condition 820 is information indicating the timing condition for forcibly restarting in order to start the error check processing and the refresh processing. The schedule 830 is the information indicating the error check schedule.

According to the restart control table 800 exemplified in FIG. 8, the storage controller 270 performs the following processing.

That is, when the error check priority is "highest", the storage controller 270 determines that the FM module 100A is immediately restarted in S612. In addition, the memory controller 103 in the restarted FM module 100A determines the error check schedule so that the error check processing and the refresh processing on the flash memory 107 is completed as soon as possible according to the notified error check priority "highest". Specifically, for example, the process proceeds to S704 as always having a task in the above S703 in order for the memory controller 103 to complete the error check processing at an early stage.

When the error check priority is "high", the storage controller 270 determines that the operation is restarted if the number of stop days P of the FM module 100A is (D1−K) days or more in S612. K may be a natural number less than D1, for example, days estimated as days required for the error check processing and the refresh processing. In addition, the memory controller 103 in the restarted FM module 100A determines the error check schedule to complete error check processing and refresh processing for the flash memory 107 within (D1−P) days according to the notified error check priority "high". For example, if P=1, since data is in an error correctable state in at least (D1−1) days, the error check may be completed within (D1−1) days.

When the error check priority is "middle", the storage controller 270 determines that the operation is restarted if the number of stop days P of the FM module 100A is (D2−K) days or more in S612. In addition, the memory controller 103 in the restarted FM module 100A determines the error check schedule to complete error check processing and refresh processing for the flash memory 107 within (D2−P) days according to the notified error check priority "middle". For example, if P=5, since data is in an error correctable state in at least (D2−5) days, the error check may be completed within (D2−5) days.

When the error check priority is "low", the storage controller 270 determines that the operation is restarted if the number of stop days P of the FM module 100A is (D3−K) days or more in S612. In addition, the memory controller 103 in the restarted FM module 100A determines the error check schedule to complete error check processing and refresh processing for the flash memory 107 within (D3−P) days according to the notified error check priority "low". For example, if P=9, since data is in an error correctable state in at least (D3−9) days, the error check may be completed within (D3−9) days.

As described above, the error check processing and the refresh processing schedule are controlled so as not to be busy more than necessary. Therefore, resources (for example, processor resource, memory resource, bus band) subjected to the processing of command received by the FM module 100A from the outside are not seized by the error check processing and the refresh processing unnecessarily. Therefore, the command processing performance seen from the outside of the FM module 100A is improved.

The condition of P for the forced restart is set so that the number of days allowed for the error check processing to be completed is at least K days. When a scale of the flash memory 107 is large, it takes a long time to complete, so it is preferable to reduce the value of the right side of P's conditional expression and increase the number of allowable days.

Since the data error of the flash memory 107 tends to increase rapidly as the rewriting frequency of the flash memory 107 is increased, upper limit values (D1, D2, and D3 related to the schedule 830) of an error check completion deadline are set large as the average rewriting frequency of the flash memory 107 is increased.

Other Embodiments

Although an embodiment of the present invention has been described above, other embodiments may be adopted.

In the above embodiment, the memory controller 103 acquires the error check priority by an error check priority notification command issued from the CPU 241 to the FM module 100, and sets the error check schedule based on the error check priority. As an embodiment different from the above embodiment, for example, the CPU 241 is configured to issue the temperature notification command to the FM module 100A. The FM module 100A receives the log information of the temperature measured by other FM module 310 or 330 by a command. The memory controller 103 in the FM module 100A uses the information to perform the determination processing shown in S603 to S611 of the flowchart of FIG. 6 in place of the storage controller 270, determines the error check priority, and sets the error check schedule based on the determination.

In the above embodiment, the temperature sensor 108 is mounted inside the FM module 100. As an embodiment different from the above embodiment, the temperature sensor may be positioned outside the FM module 100. For example, the plurality of temperature sensors are arranged side by side in the vicinity of the connector 260 of the storage controller 270 (for example, the plurality of temperature sensors are installed along the arrangement direction of the FM module 100), and the storage controller 270 may measure the ambient temperature of each FM module 100 (for example, the temperature measured by a certain temperature sensor may be regarded as the ambient temperature of the FM module 100 corresponding to the temperature sensor). The temperature sensor and the FM module 100 may be 1:1, 1:many, or many:1.

In the above embodiment, the temperature information is acquired from the FM module adjacent to the stopping FM module 100A. As an embodiment different from the above embodiment, if the temperature condition of the stopping FM module 100A can be sufficiently estimated, the temperature information may be acquired from the FM module which is not adjacent thereto.

In the above embodiment, the supply of power to the FM module 100A which is not scheduled to be used is stopped. As a different embodiment, the FM module 100A may be shifted to the low power consumption state such as a sleep state or a standby state and may be shifted to an active state when the operation is restarted, without stopping the supply of power to the FM module 100A. That is, the stop of the supply of power may be an example of setting the power consumption to a low power consumption state in which the error check processing and the refresh processing cannot be performed. When the low power consumption state is released, the FM module 100A enters an operating state which is the state in which the error check processing and the refresh processing can be performed. The FM modules 100B and 100C may be an example of one or more FM modules 100 in an operating state.

In addition, instead of the memory controller 103 in the FM module 100A, the storage controller 270 may determine the error check schedule according to the error check priority. In this case, the storage controller 270 may hold the entire restart control table 800. The storage controller 270 notifies the FM module 100A of the control information including the determined error check schedule. This control information may not include the error check priority and the the number of stop days necessary for determining the error check schedule. The memory controller 103 in the FM module 100A performs the error check processing and the refresh processing according to the error check schedule in the notified control information.

In addition, the control information from the storage controller 270 to the FM module 100A may not include logical address range information. In other words, the FM module 100A may hold the information indicating the logical address range having a relatively high read frequency among the logical address spaces provided by the FM module 100A.

REFERENCE SIGNS LIST

100 FM module

The invention claimed is:

1. A storage apparatus, comprising:
an interface unit configured to include one or more interfaces connected to a plurality of nonvolatile semiconductor memory devices which are a plurality of devices having a plurality of nonvolatile semiconductor memories;
a storage unit configured to include one or more memories; and
a processor unit configured to include one or more processors connected to the interface unit and the storage unit,
wherein the processor unit releases a low power consumption state of a first nonvolatile semiconductor memory device at a timing according to a lapsed time after the first nonvolatile semiconductor memory device in the low power consumption state in which the error check processing and the refresh processing are not performed is in the low power consumption state and an estimated ambient temperature of the first nonvolatile semiconductor memory device at the lapsed time,
the error check processing is processing of checking the number of errors which is the number of errors in data read from a first area in a nonvolatile semiconductor memory in the first nonvolatile semiconductor memory device,
the refresh processing is processing of moving error-corrected data to a second area in the nonvolatile semiconductor memory in the first nonvolatile semiconductor memory device when the number of errors specified in the error check processing is equal to or greater than a predetermined number,
the first nonvolatile semiconductor memory device is any of the plurality of nonvolatile semiconductor memory devices, and
the first nonvolatile semiconductor memory device executes the error check processing and the refresh processing when the low power consumption state is released.

2. The storage apparatus according to claim 1, wherein the processor unit specifies whether the estimated ambient temperature at the lapsed time is suitable for any of a plurality of temperature conditions, and
the timing is timing according to the lapsed time and a timing condition corresponding to the specified temperature condition among the plurality of timing conditions.

3. The storage apparatus according to claim 2, wherein the plurality of temperature conditions includes:
a first temperature condition indicating that a highest estimated ambient temperature at the lapsed time is equal to or higher than a first temperature, and
a second temperature condition indicating that the highest estimated ambient temperature is lower than a second temperature, and
the second temperature is a temperature lower than the first temperature.

4. The storage apparatus according to claim 3, wherein the plurality of temperature conditions further includes:
a third temperature condition indicating that a temperature based on a plurality of estimated ambient temperature at the lapsed time is lower than a third temperature, and
a fourth temperature condition indicating that the temperature based on the plurality of estimated ambient temperature is equal to or higher than the third temperature.

5. The storage apparatus according to claim 2, wherein at least one of the plurality of timing conditions is that the number of lapsed days is equal to or greater than a difference between a time according to a temperature condition corresponding to the timing condition and a time allowed to complete the error check processing.

6. The storage apparatus according to claim 1, wherein the plurality of nonvolatile semiconductor memory devices are arranged,
when each of the plurality of nonvolatile semiconductor memory devices is in an operating state in which the error check processing and the refresh processing can be performed, a temperature in the nonvolatile semiconductor memory device is measured,
the estimated ambient temperature is a temperature based on one or more temperatures measured in one or more second nonvolatile semiconductor memory devices among the nonvolatile semiconductor memory devices other than the first nonvolatile semiconductor memory devices, and each of the one or more second nonvolatile semiconductor memory devices is the nonvolatile semiconductor memory device in the operating state.

7. The storage apparatus according to claim 6, wherein when at least one of the nonvolatile semiconductor memory devices on both sides of the first nonvolatile semiconductor memory device is in the operating state, the one or more second nonvolatile semiconductor memory devices are at least one of the nonvolatile semiconductor memory devices on the both sides.

8. The storage apparatus according to claim 1, further comprising:

a plurality of temperature sensors measuring a temperature of the plurality of nonvolatile semiconductor memory devices installed outside the plurality of nonvolatile semiconductor memory devices, wherein the estimated ambient temperature is a temperature based on one or more temperatures measured by one or more temperature sensors corresponding to the first nonvolatile semiconductor memory device among the plurality of temperature sensors.

9. The storage apparatus according to claim 1, wherein the first nonvolatile semiconductor memory device in an operating state completes the error check processing and the refresh processing according a target schedule which is a schedule according to the lapsed time and an estimated ambient temperature of the first nonvolatile semiconductor memory device at the lapsed time.

10. The storage apparatus according to claim 9, wherein the processor unit specifies whether the estimated ambient temperature at the lapsed time is suitable for any of a plurality of temperature conditions, and the target schedule is a schedule corresponding to the specified temperature condition among a plurality of schedules.

11. The storage apparatus according to claim 10, wherein at least one of the plurality of schedules indicates a period which is equal to or smaller than a difference between a time according to the temperature condition corresponding to the schedule and the lapsed days.

12. The storage apparatus according to claim 1, wherein the processor unit transmits control information, to the first nonvolatile semiconductor memory device, according to the lapsed time and the estimated ambient temperature of the first nonvolatile semiconductor memory device at the lapsed time when the low power consumption state of the first nonvolatile semiconductor memory device is released, and the first nonvolatile semiconductor memory device executes the error check processing and the refresh processing based on the control information when being in an operating state.

13. The storage apparatus according to claim 12, wherein the control information includes information indicating a logical address range with a relatively high read frequency in a logical address space provided by the first nonvolatile semiconductor memory device, and the first nonvolatile semiconductor memory device preferentially selects a physical area allocated to the logical address range as a physical area as a target of the error check processing and the refresh processing in the nonvolatile semiconductor memory in the first nonvolatile semiconductor memory device.

14. The storage apparatus according to claim 12, wherein the first nonvolatile semiconductor memory device in an operating state completes the error check processing and the refresh processing according a target schedule which is a schedule according to the lapsed time and an estimated ambient temperature of the first nonvolatile semiconductor memory device at the lapsed time, the processor unit specifies whether the estimated ambient temperature at the lapsed time is suitable for any of a plurality of temperature conditions, and the control information includes information indicating the suitable temperature condition and the number of lapsed days, or information indicating the target schedule.

15. A memory device control method, comprising:

specifying a timing according to a lapsed time after a first nonvolatile semiconductor memory device in a low power consumption state in which error check processing and refresh processing are not performed is in the low power consumption state and an estimated ambient temperature of the first nonvolatile semiconductor memory device in the lapsed time;

executing, by the first nonvolatile semiconductor memory device, the error check processing and the refresh processing when the low power consumption state is released; and releasing the low power consumption state of the first nonvolatile semiconductor memory device at the specified timing, wherein the first nonvolatile semiconductor memory device is any of a plurality of nonvolatile semiconductor memory devices which are a plurality of devices having a plurality of nonvolatile semiconductor memories, the error check processing is processing of checking the number of errors which is the number of errors in data read from a first area in a nonvolatile semiconductor memory in the first nonvolatile semiconductor memory device, and the refresh processing is processing of moving error-corrected data to a second area in the nonvolatile semiconductor memory in the first nonvolatile semiconductor memory device when the number of errors specified in the error check processing is equal to or greater than a predetermined number.

* * * * *